United States Patent [19]

Timm

[11] 4,388,712

[45] Jun. 14, 1983

[54] COMBINED ELECTRONIC APPARATUS INDICATOR AND CASSETTE TAPE TRANSDUCER APPARATUS, PARTICULARLY COMBINED RADIO-RECORDER FOR AUTOMOTIVE USE

[75] Inventor: Horst Timm, Hildesheim, Fed. Rep. of Germany

[73] Assignee: Blaupunkt-Werke GmbH, Hildeshein, Fed. Rep. of Germany

[21] Appl. No.: 165,092

[22] Filed: Jul. 1, 1980

[30] Foreign Application Priority Data

Jul. 11, 1979 [DE] Fed. Rep. of Germany ....... 2927984

[51] Int. Cl.³ ............................................. G11B 31/00
[52] U.S. Cl. ......................................... 369/10; 369/11; 369/12; 360/137
[58] Field of Search ....................................... 369/1-2, 369/5-12; 360/137, 96.5, 96.6; D14/5-7; 179/1 VE; 455/344-346; 312/7 R, 8-14

[56] References Cited

U.S. PATENT DOCUMENTS

| | | | |
|---|---|---|---|
| 2,536,123 | 1/1951 | Berry | 369/12 |
| 2,579,684 | 12/1951 | Lorza | 369/12 |
| 3,766,327 | 10/1973 | Johnson et al. | 360/96.6 |
| 3,981,265 | 9/1976 | Gilbert | 369/10 |
| 4,196,319 | 4/1980 | Gates | 179/1 VE |
| 4,205,353 | 5/1980 | Okatani et al. | 360/61 |

Primary Examiner—Raymond F. Cardillo, Jr.
Attorney, Agent, or Firm—Frishauf, Holtz, Goodman & Woodward

[57] ABSTRACT

To provide ample space for display of output of electrical signals, typically frequency and operating conditions of a radio receiver, tape recorder, and other electronic components, a display panel (16) with liquid crystal display (LCD) or light emitting diode (LED) display elements (18) is integrated with the cover plate (14) behind which a cassette of a cassette recorder can be inserted, so that the space taken up by the panel for the cassette recorder is utilized as an indicator. Additional indicating functions, such as in an automobile, outputs of trip computers, digital clock indications, and the like, can be provided on a display panel.

8 Claims, 8 Drawing Figures

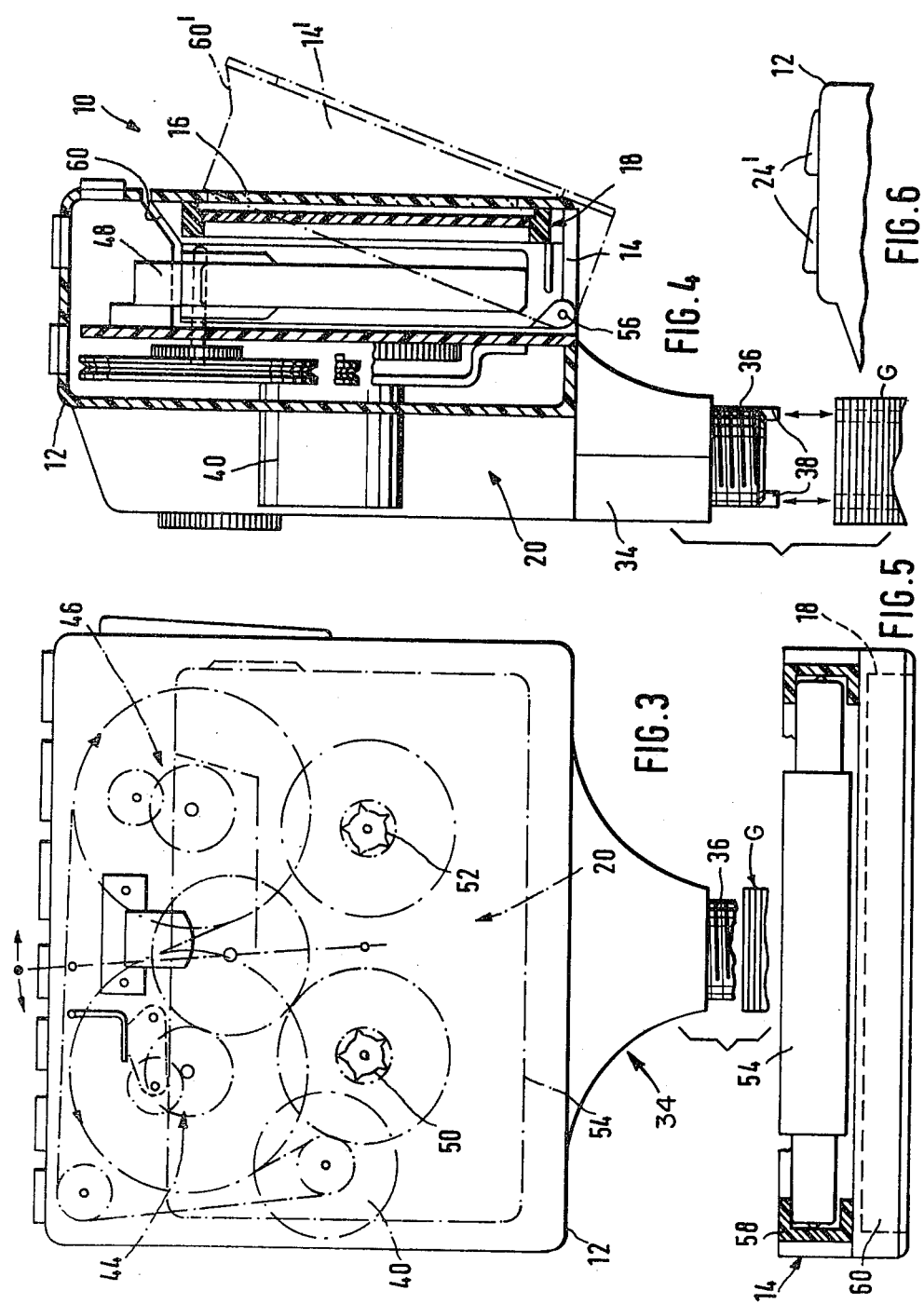

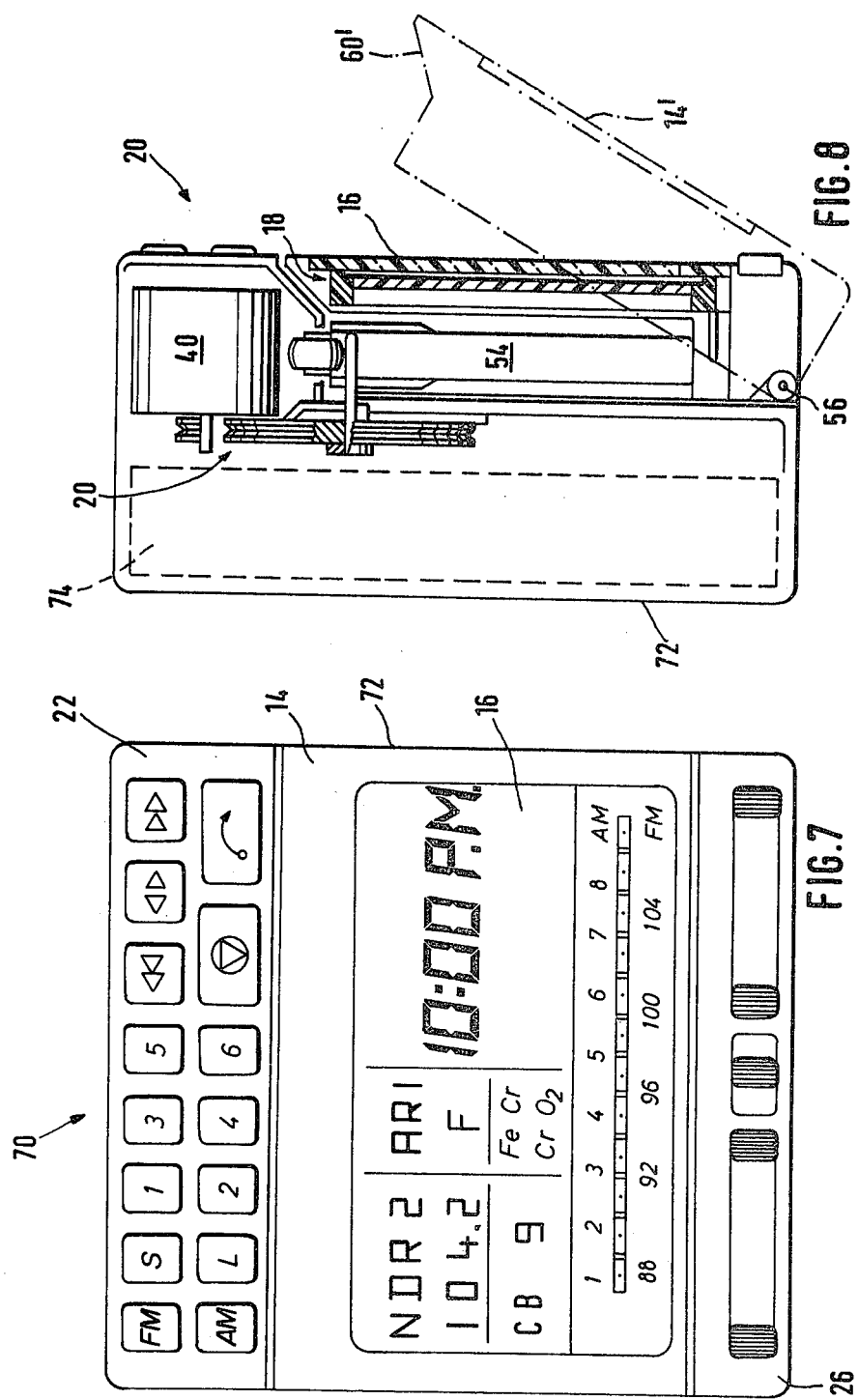

COMBINED ELECTRONIC APPARATUS INDICATOR AND CASSETTE TAPE TRANSDUCER APPARATUS, PARTICULARLY COMBINED RADIO-RECORDER FOR AUTOMOTIVE USE

The present invention relates to a combined electronic apparatus indicator and cassette tape transducer, and more particularly to a combined radio receiver-cassette tape recorder/transcriber for installation in an automotive vehicle.

BACKGROUND AND PRIOR ART

Magnetic tape, particularly for entertainment use, is available on reels, in cassettes, and cartridges. When intended for combination with a radio, it is customary to use either cartridges or cassettes. In cartridges, the tape is at the end of an essentially square cartridge, for longitudinal insertion into a suitable reception apparatus. In cassettes, the tape is usually located on adjacent reels, and the cassette is inserted flat, from the top, or slid into a receiving cover which is then pivoted closed. Combination radio receiver-cassette recorder/transcribers—in short, combined radio-cassette recorders for portable use are well known.

Front loading cassette apparatus has some advantage with respect to cartridges which, essentially, are concerned with the drive mechanism for the tape in the cassette. Upon introduction of a cassette, it is only necessary to move the tape head and/or a rubber pressure roller. To start the tape in a cartridge, however, it is usually necessary to move elements of substantially larger mass and complexity.

Cartridge recorders, having an insertion slot for the respective cartridge, require movement of the cartridge perpendicularly to the insertion motion or, respectively, moving a drive mechanism with respect to the cartridge. The drive mechanism, containing drive elements and frequently also the drive motor for the cartridge, is comparatively heavy. This relative movement between casette and drive mechanism—either by moving the drive mechanism into the cassette, or the cassette over the drive mechanism, engages a drive capstan with suitable drive openings in the cassette.

Front loading cartridge recorders are more simple and can be manufactured cheaper, and are easier to operate than the cartridge elements, since the insertion of the cassettes is simpler and the operating forces are smaller than those used with cartridges in which a drive support plate or the cartridge, respectively, must be moved.

Combined cartridge-radio receivers for automotive use are well known. Such combined apparatus, in spite of the advantages of front loading cassettes, usually have cartridges with an insertion slot for the cartridge itself. In automotive applications, simple operation, low weight, and resistance against shock or vibration is particularly important. Additionally, the insertion movement should be as simple as possible so that change of the cartridge and/or cassette should not detract the attention of the driver from traffic conditions.

Front loading cassette apparatus have not been used in combination with automobile radio/recorders primarily since the space available on the dashboard becomes less and less, particularly as the size of vehicles decreases. Due to the limited space availability, which is particularly apparent in automotive radio/recorder combinations, additional problems arise since the space for operating elements and indicators of the operation of the radio receiver becomes smaller and smaller.

It has already been proposed to separate the receiver and the electronics of tape transducers from the control elements therefor as such. The electronic components, thus, are separated from the drive mechanism for the cassette as well as from the control elements for both the cassette and for the radio. In such an arrangement, a comparatively large area, and thus easily readable scale, and the operating controls for the radio and the tape apparatus are combined on an operating frame which may be connected by a hollow gooseneck which is freely movable in various directions to permit control of the electronic components as such. The electrical connections between the combination element, that is, between the electronics and the control therefor, are carried within the gooseneck. The operating motor, drive elements, and the like, for the cassette are included in the space made available within the dashboard for an automotive radio. The radio itself is remotely positioned. This arrangement leaves only limited space for the control elements since the slot for introduction of the cartridge and the drive elements in combination therewith, and to effect relative movement of the drive elements and of the cartridge are comparatively space consuming.

THE INVENTION

It is an object to provide a combined electronic element-tape cassette transducer, in short and hereinafter radio/recorder combination, which is particularly adaptable for assembly in automotive vehicles in which front loading of a flat cassette is possible while providing an easily legible large-area indicator for information regarding the operating conditions of the radio and/or recorder and, if desired, other operating conditions of the motor vehicle as such. The operating conditions may, for example, provide indications of the type of reception—AM or FM—frequency or station selection, whether stereo reception is selected, and the respective operating conditions—record, playback, fast forward, fast rewind, etc., of the recorder.

Briefly, in accordance with the invention, a pivotable cover plate is secured to a support to hold and receive a front loading cassette, as is well known in connection with portable radio/recorders. The drive means for the tape in the cassette likewise are located close to and in association with the cover plate. In accordance with the invention, a large-area display panel is secured to the front of the pivotable cover plate, and electronic display indicator means, such as a liquid crystal display (LCD), a light emitting diode (LED) display, or the like, and operatively associated to be controlled by the electrical signals from the radio or other electronic apparatus, for example computer apparatus associated with vehicle operation or the like, are connected to the display indicator means.

Integrating the display indicator with the holder for the cassette, therefore, permits placement of a pivotable cassette insertion cover in the limited space available in an automotive vehicle without requiring more space than heretofore, thus permitting use of flat cassettes, while still providing easily legible information regarding the operation of the electronic unit, typically a radio receiver.

The front loading principle has several advantages, mainly simplicity in manufacture, and ease of operation.

The invention permits utilization of the space taken up by the front loading mechanism in order to provide a desired large-area display surface. This space, previously, was not utilized except for advertising or, possibly, to provide a window so that the change in diameter of the respective reels, as they are being wound, can be observed. This type of determination of winding position, of course, inherently, is inaccurate.

It is not necessary that the indications displayed on the panel necessarily are only those indicating the operating conditions or characteristics of a radio receiver; additional indications may be provided, for example outputs from other electronic elements of a vehicle or other apparatus, for example outputs from a trip computer or the like.

Different embodiments of the invention permit combining a radio cassette recorder with the large-area indicator in a common compact housing; alternatively, the drive apparatus for the tape in the cassette can be separated from the electronic component and connected thereto by cabling or the like. The particular embodiment selected will depend on the application and use, and the available space for installation of the electronic equipment. For example, the integrated form of construction, in which the electronics, the tape loading and drive unit and the display are all in a single unit are preferred in integrated high-fidelity installations, or for automobile radios in which sufficient space is available behind the dashboard for its installation. In some vehicles, however, the space behind the dashboard is insufficient, or required for other devices or apparatus, pockets, or glove compartments, or the like, in which it is then desirable to separate the electronic component and the cassette recorder tape drive component, with the insertion and indicating panel, and to interconnect the components by a cable, gooseneck, or the like.

DRAWINGS

FIG. 3 is a front view of the apparatus of FIG. 1, partly in phantom, partly exploded, showing one possible arrangement of the drive components for the tape;

FIG. 4 is a side view, partly in section partly exploded, of the apparatus of FIG. 3, and showing drive components;

FIG. 5 is a transverse, part-sectional view of the front loading cover;

FIG. 6 is a fragmentary side view of the top portion of the cover, illustrating another embodiment of pushbutton switches or knobs, for use in the apparatus of FIG. 5;

FIG. 7 is a front view of a combined radio recorder and illustrating another embodiment; and FIG. 8 is a side view, partly in section, of the embodiment of FIG. 7.

Figure 1:
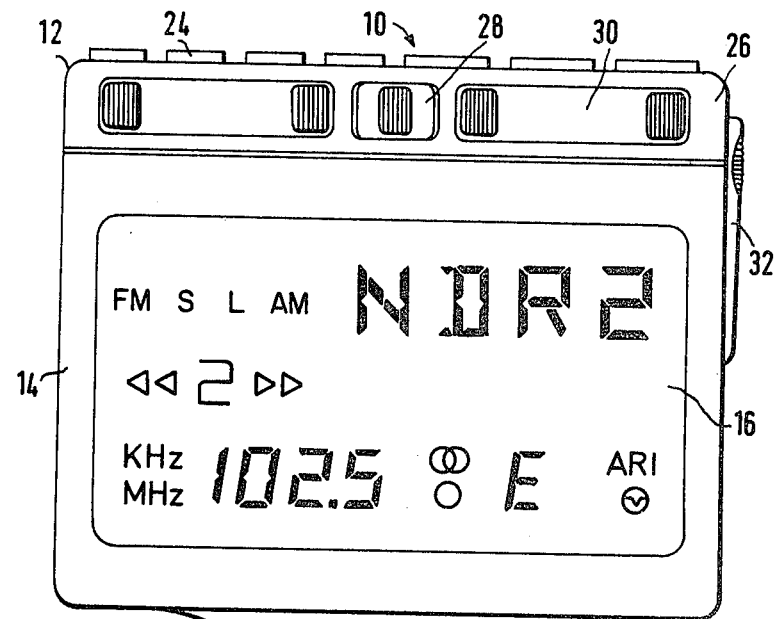
FIG. 1 is a front view of one embodiment of the cassette apparatus showing a gooseneck support in exploded representation.
Figure 2:
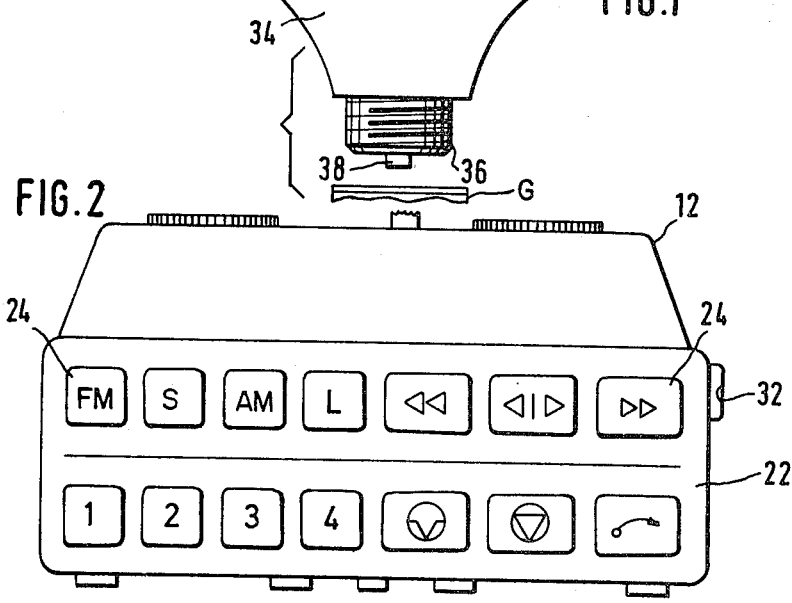
FIG. 2 is a top view of the apparatus of FIG. 1.

A front loading cassette apparatus 10—see FIGS. 1 to 4—is intended for combined operation with a radio receiver. The radio receiver portion itself is located in a housing component separate and apart from the apparatus 10.

The apparatus 10 has a housing 12 with a front loading cover 14. In accordance with the invention, the front surface of the loading cover provides a display panel 16 on which an integrated display indicator array 18 is located. The housing 12 for the apparatus 10 also includes the tape drive elements 20. One possible arrangement of the tape drive elements is shown in FIG. 3.

The apparatus 10 includes operating elements for the cassette drive 20 as well as for the electronic components, typically the associated radio receiver, which is remotely located but controllable from the apparatus 10. FIG. 1 shows possible operating elements which are included, for example, in a button or knob array 22 (FIG. 2) on the top side of the housing. The buttons 24 carry symbols or letter designations. Additionally, rocker switches or slide switches may be located on the front cover in an operating panel 26. As shown, slide switches 28, 30 are provided. The slide switches may, also, provide analog slide movement, for example for volume, tone, or balance control. An additional snap or slide switch 32, for example a main ON/OFF switch, is located at the side of the housing 10.

The indicator display panel 16 can carry display indications, for example as shown in FIG. 1. It can be placed in a recess of cover 14.

The housing 10 is secured to a holding portion 13 (FIGS. 1, 3) at the lower side thereof, which merges into a hollow flexible connecting support formed by, a gooseneck G. The electrical connections are threaded through the support 34 into a coupling 36. Coupling 36 has an external thread for attachment to hollow gooseneck G, which can be threaded on the coupling 36. Projections 38 are provided to insure proper positioning of the gooseneck G with respect to the holder 34, and to prevent relative rotation.

The drive mechanism 20 for the drive can be constructed in customary and well known manner and, therefore, is shown only highly schematically in FIGS. 3 and 4. It includes a drive motor 40, two tape drive wheels 44, 46, a capstan shaft, and a movable pressure roller, and a combined reproducing-recording transducer magnetic head 48 (FIG. 4) secured to a carrier plate. Two drive hubs 50, 52, for example driven by a belt or friction wheel drive, are in rotary drive connection with the wheels 44, 46 and, upon closing of the cover plate 14, cause engagement of the respective drive units with the tape in the cassette 54 (FIG. 5). The front cover plate 14 has the display indicator 18 secured thereto—see FIG. 4—to provide a large-area flat display panel 16 at the front side of the cover plate 14. The display indicators may contain any well known display unit, such as, for example, liquid crystal display (LCD) elements or light emitting diode (LED) elements, and form multiple segment indicators as well known. The particular display selected is determined essentially by economics, appearance, and availability of structural space. Both the LCD and the LED elements are shallow, that is, require only little depth for display, so that the cover 14 is eminently suitable to receive the display indicators 18, and need be brought forward beyond the usual dimension of such cover plates only slightly. Any type of display indicator which is shallow and requires only a minimum of installation depth, while not generating appreciable operating heat, can be used. LCD indicators are preferred, since a large-area field can be provided which is particularly suitable for use in automotive vehicles because the display is easily legible during day or night. The electrical connections to the display indicator 18 are carried out in a suitable cable which is flexible so that the cover 14 can be pivoted from the full-line position (FIG. 4) to the chain-dotted line position indicated at 14'. The flexible cable connections can be carried out through the hollow support 34; small electronic components may also be included within the housing which carries the drive system, for example a driver for the display.

The front cover plate 14 which faces the drive mechanism 20 is formed with the well known U-shaped guide rails 58 (see FIG. 5) to guide a cassette 54 introduced therein.

The front loading cover 14 is formed at its upper edge with an inclined guide surface 60 leading to the U-shaped guide rails 58 in order to facilitate introduction of a cassette behind the cover plate when it has been tipped forwardly (see chain-dotted position, FIG. 4).

FIG. 6 illustrates a modified form of the housing 12, which has buttons 24' which are inclined at the forward side providing an inclined forward surface. The respective control buttons 24', correspond to control buttons 24 (FIGS. 1, 2) they are so shaped and located to improve reliability of operation, particularly when the operator controls the respective pushbuttons or knobs by touch, rather than by visually observing the particular knob which he is controlling.

Embodiment of FIGS. 7 and 8: The apparatus 70 includes, as one integrated unit, a radio receiver and the cassette recorder. Both the electronic components for the receiver, all the necessary operating knobs, buttons, and the like, and the indicator to indicate the operation, are in one common housing 72.

Space 74, shown in broken lines (FIG. 8) is available to hold the electronic components of the radio receiver. It is located behind the drive system 20 for the tape drive. The housing portion 72 of the apparatus 70 of FIGS. 7, 8 thus is somewhat deeper than the housing 12 of FIGS. 1-4, since space must be provided for the electronic components of the radio receiver. This space becomes less and less with the availability of integrated circuits for standard circuit portions thereof. The operating parts for the tape drives themselves can be identical or slightly changed. Similar components, therefore, have been given the same reference numerals.

The tape drive 20 is slightly changed in that the drive motor 40 is located in the upper portion of the housing, combined with a drive support plate, in order to leave as much space as possible for the electronic components in space 74. The array of pushbuttons for control are located on a somewhat extended head strip at the front of the housing. The control panel 26, for slider switches and the like, is moved to the button, below the indicator panel. The indicator panel 26 is changed somewhat with respect to FIG. 1, in that the arrangement of the display is different. Of course, the arrangement of the display can be selected as desired, and in the light of the functions to be displayed. The free space of the display panel 14 includes an LED operated scale for analog indication of frequency selected by the radio receiver, and other indications, for example the channel of a citizen-band receiver integrated with the radio equipment which has been selected. Additional indications may be provided, for example for an electronic vehicle computer system, such as a trip computer, which provides output indications to guide the operator to a selected location; further, indications can be provided regarding the type of tape used—chromium oxide or iron-chromium tape. Space is left additionally for other output indications, for example to display time, so that the display panel can also be used as a digital clock. A tape counter display likewise can be provided.

The embodiment of FIGS. 7 and 8 is particularly suitable for incorporation of the cassette-radio recorder in the dashboard of an automotive vehicle in which, for example, the overall construction is so arranged that, when the front cover 14 is closed, the entire unit is inclined rearwardly. Upon opening of the front cover 14', it will then stand essentially vertically, or be tipped forwardly only slightly. Of course, additional cabling can be introduced into the space 74 of the housing 72 in any suitable manner, and the housing 72 can be constructed for attachment to a suitable holder, which may, if desired, include a hollow portion for supply of additional cables carrying output indicating signals, operating signals, and power supply.

The concept of integrating the display on the front cover of a cassette recorder, thus, permits a large-area display panel with good visibility and readability of operating conditions, and functions of electronic equipment, typically of an automobile radio, so that the advantages of front loading cassettes in combination with electronic equipment can be realized with a minimum of required space for display of controlled functions and for control of the electronic equipment as such. The invention may, of course, be used with any type of electronic equipment and is not limited to automobile radios; it is particularly suitable for all types of portable radio and/or high-fidelity combinations.

Various changes and modifications may be made, and features described in connection with any one of the embodiments may be used with any of the others, within the scope of the inventive concept.

I claim:

1. Combined electronic indicator and cassette tape transducer apparatus (10), particularly for automotive installations, having
    a housing (12);
    a pivotable cover plate (14) secured to the housing;
    guide means (58) on the cover plate for sliding movement of a cassette parallel to said cover plate to receive a tape cassette in said housing;
    drive means (20, 40, 44, 46, 50, 52) secured within the housing and engageable with a tape in the cassette when the cassette is inserted in the cover plate and the cover plate is pivoted into a closed position;
    means carrying electrical signals representative of operation of an electronic apparatus;
    operating and control elements (24, 24', 26, 28, 30, 32) connected to the electrical signal carrying means and controlling the drive means;
    an indicator display panel (16) mounted on the cover plate (14);
    and display indicator means (18) on the display panel, connected to and controlled by the electrical signals carried by the signal carrying means to indicate operation of an electronic apparatus generating said signal;
    the housing (12, 72) forming a combined and housing support for said drive means and for said operating and control elements located in, and on said housing;
    and a flexible, hollow gooseneck (G) attached to said housing to provide a flexible holding support for said housing, the drive means therein, and said operating and control elements thereon.

2. Apparatus according to claim 1 further including a radio receiver generating said electrical signal;
    and wherein said display panel includes display of frequency to which the radio receiver is tuned.

3. Apparatus according to claim 1, wherein the display indicator means (18) comprises a liquid crystal display (LCD).

4. Apparatus according to claim 1, wherein the display indicator means (18) comprises a light emitting diode (LED) display.

5. Apparatus according to claim 1, wherein the display panel (16) is positioned in a recess of the front side of the cover plate (18).

6. Apparatus according to claim 1, wherein the guide means comprises U-shaped guide rails (58) located on the cover plate (14), and an inclined guide surface (60) leading towards said guide rails, the guide rails being located at the rearward side of the front cover plate.

7. Apparatus according to claim 1 further including a radio receiver generating said electrical signal;

and wherein said operating and control elements include operating elements for tuning and volume control of said radio receiver.

8. Combined automobile radio receiver, cassette tape transducer apparatus and electronic indicator and operating control unit comprising a housing (72);

a pivotable cover plate (14) secured to the housing;

guide means (58) on a cover plate for sliding movement of a cassette parallel to said cover plate to receive a cassette in said housing;

drive means (40, 44, 46, 50, 52) secured within the housing and engageable with a tape in the cassette when the cassette is inserted in the cover plate and the cover plate is pivoted into a closed position;

a radio receiver located within said housing;

operating and control elements connected to the radio receiver and controlling the drive means;

an indicating display panel (16) mounted on a cover plate (14);

and display indicator means (18) on the display panel (16) connected to and controlled by electrical signals derived from said radio receiver and carrying means to indicate operation of said radio receiver generating said signals, the housing (72) forming a combined housing and support for said drive means, said radio receiver and said operating and control elements.

* * * * *